(12) United States Patent
Noel et al.

(10) Patent No.: US 6,481,760 B1
(45) Date of Patent: Nov. 19, 2002

(54) THREADED CONNECTION OF TWO METAL TUBES WITH GROOVE IN THE THREADING

(75) Inventors: Thierry Noel, Sebourg; Emmanuel Varenne, Valenciennes, both of (FR)

(73) Assignee: Vallourec Mannesmann Oil & Gas France, Aulnoye-Aymeries (FR)

( * ) Notice: Subject to any disclaimer, the term of this patent is extended or adjusted under 35 U.S.C. 154(b) by 0 days.

(21) Appl. No.: 09/530,596

(22) PCT Filed: Sep. 2, 1999

(86) PCT No.: PCT/FR99/02085

§ 371 (c)(1),
(2), (4) Date: Jun. 29, 2000

(87) PCT Pub. No.: WO00/14442

PCT Pub. Date: Mar. 16, 2000

(30) Foreign Application Priority Data

Sep. 7, 1998 (FR) .............................. 98 11278

(51) Int. Cl.$^7$ ................................................ F16L 25/00
(52) U.S. Cl. ...................... 285/334; 285/333; 285/355; 285/390; 411/311
(58) Field of Search ................................ 411/311, 310, 411/411; 285/333, 334, 355, 390

(56) References Cited

U.S. PATENT DOCUMENTS

| | | | | |
|---|---|---|---|---|
| 3,989,284 A | * | 11/1976 | Blose | 285/334 |
| RE30,647 E | * | 6/1981 | Blose | 285/334 |
| 4,764,067 A | * | 8/1988 | Kawashima | 285/310 |
| 4,822,081 A | * | 4/1989 | Blose | 285/334 |
| 5,462,315 A | * | 10/1995 | Klementich | 285/334 |
| 5,681,059 A | * | 10/1997 | Mackie | 285/334 |
| 5,954,374 A | * | 9/1999 | Gallagher et al. | 285/332 |
| 5,964,486 A | * | 10/1999 | Sinclair | 285/331 |
| 6,216,510 B1 | * | 4/2001 | Hashimoto | 411/311 |

FOREIGN PATENT DOCUMENTS

| | | | |
|---|---|---|---|
| GB | 2099529 A | * | 12/1982 |
| GB | 2113335 A | * | 8/1983 |

* cited by examiner

*Primary Examiner*—Lynne H. Browne
*Assistant Examiner*—Aaron Dunwoody
(74) *Attorney, Agent, or Firm*—Oblon, Spivak, McClelland, Maier & Neustadt, P.C.

(57) ABSTRACT

A threaded connection for two metal pipes including a male element at the end of a first pipe and a female element at the end of a second pipe, the male element including a male external thread, the female element including a female internal thread. The male and female threads are screwed one into the other. At least one of the male or female threads includes a groove formed in the thread and opening either into a stabbing flank or into a crest of the thread or straddling the stabbing flank and the thread crest. The groove is disposed in the thread so as to increase the flexibility of the portion of the thread which comes into pressure contact with the mating thread or to reduce the contact surfaces or to affect the two aspects at the same time.

21 Claims, 7 Drawing Sheets

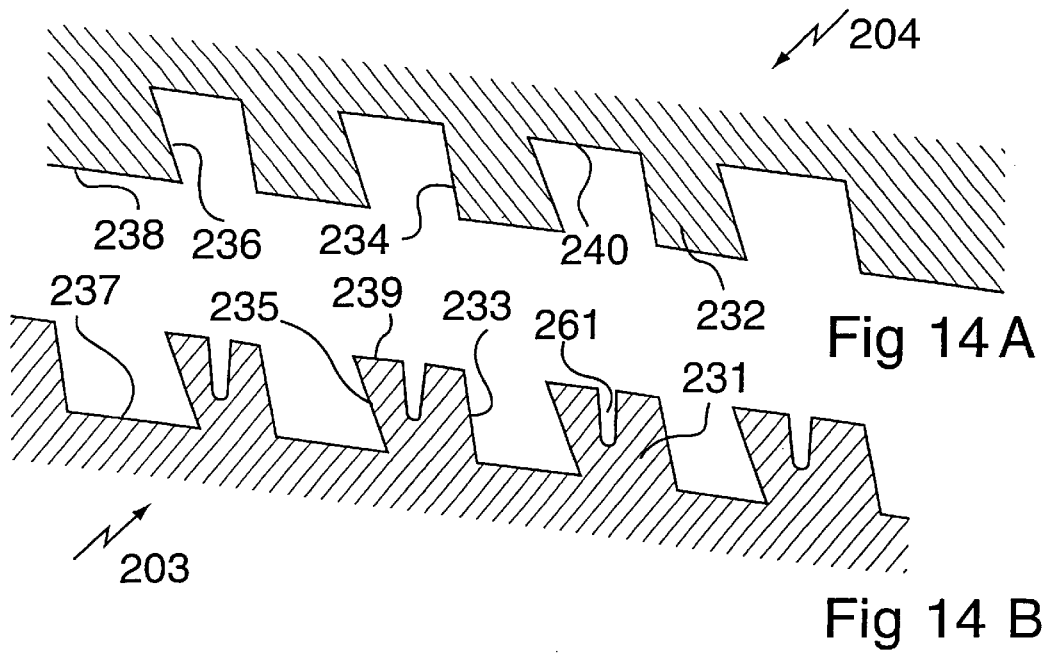
Fig 14 A
Fig 14 B
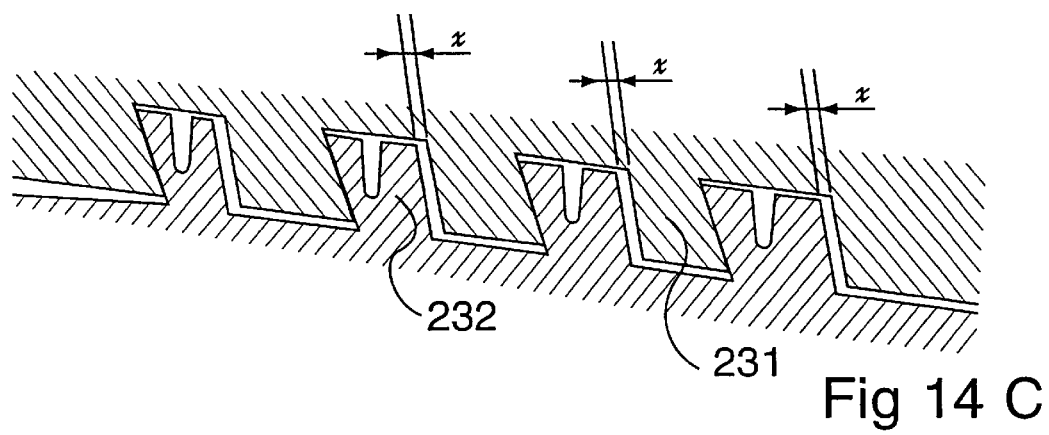
Fig 14 C
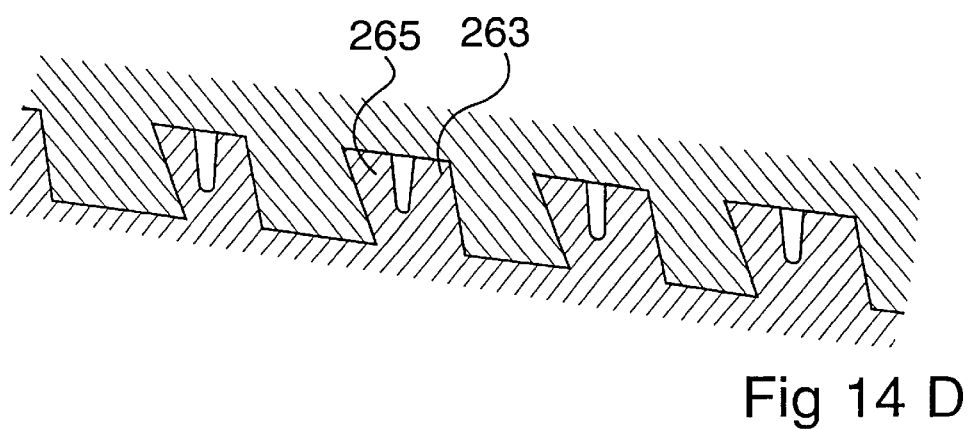
Fig 14 D

THREADED CONNECTION OF TWO METAL TUBES WITH GROOVE IN THE THREADING

BACKGROUND OF THE INVENTION

1. Field of the Invention

Such connections are known, in particular for strings of casing pipes or production tubing or strings of drill pipes for hydrocarbon wells.

2. Discussion of the Background

In the remainder of the present document, the term "threaded connection for two metal pipes" will encompass both a so-called integral connection between two long pipes and a connection between a first long pipe and a second, short, pipe such as a coupling.

Thus the American Petroleum Institute (API) defines:

in specification API 5CT, metal pipes and threaded metal pipe connections for production and for casing hydrocarbon wells;

and in specification API 5B, standard tapered thread forms for such connections and standard thread forms for triangular, "round" or trapezoidal threads.

API 5B triangular or round thread forms comprise, on each of the male and female elements, two lateral flanks—a load flank and a stabbing flank—each at 30° either side of a plane normal to the axis of the connection.

At the end of the connection makeup, because of the taper of the thread forms, each of the two flanks is in contact under a metal-metal contact pressure with its mating flanks and a clearance exists between the crest and root of the mated threads, the crests and roots of the threads being very rounded in the case of round threads.

API 5B trapezoidal thread forms comprise, on each of the male and female elements, two lateral flanks—a load flank and a stabbing flank—slightly inclined with respect to a plane normal to the connection axis, a thread root and a thread crest generally parallel to the thread taper, the shape of the female threads mating perfectly with that of the male threads.

At the end of makeup of this type of connection with API 5B trapezoidal threads, because of the taper of the thread forms, the thread crest of at least one of the male or female elements is in contact, under a metal-metal contact pressure, with the root of the thread of the mated element; further, the load flanks are also in contact while a clearance exists between the stabbing flanks, at least in the most frequently encountered case where the elements of the connection are under tension from the weight of the string, for example, or from the bearing reaction of the abutments.

Such connections with an axial clearance are termed "with interfering threads" since they develop a radial interference between the mating threaded surfaces which results in a metal-metal contact pressure between these surfaces and in an increase in the makeup torque, the increase being due to the friction to be overcome. The intensity of the radial interference is measured by the value of the diametrical interference.

As is known, the term "diametrical interference" means the difference in diameter between a point on the male element and the mating point on the female element when the elements are not connected; a positive value for the diametrical interference means that a contact pressure exists in the contact zones of the connection; a zero value for the diametrical interference means a simple contact without a contact pressure, and a negative value for the diametrical interference means a radial clearance.

In other types of connections such as that described in European patent application EP-A-0 454 147, the thread form is designed so that the two lateral flanks just come into contact at the end of connection makeup; in contrast a clearance can be provided between the roots and crests of mated threads.

Such connections, termed "trapezoidal threaded with no axial clearance" in the remainder of the document, allows operation both in axial compression and in axial tension or bending.

Other connections such as those described in U.S. Pat. Nos. 2,211,179, 4,161,332 or 4,537,428 use a two-step straight thread with trapezoidal threads. Such thread forms normally do not have radial interference, contact between the threads only occurring at the load flanks, in particular the load flanks when the connection is subjected to axial tension forces.

US-RE30647 describes a variation of a threaded connection with two-step straight threads and a trapezoidal thread form known as wedge threads, the width of the male and female threads varying along the length of each step of the thread in a co-ordinated manner such that, as the male element is gradually screwed into the female element, the axial spaces between the male and female flanks existing on engaging the elements reduce to zero; the lateral flanks thus act as an abutment and to position the independent sealing surfaces.

In the remainder of the present document, the term "wedge thread" or "variable width thread" will be used for a thread with such characteristics.

US RE34467 describes an adaptation of a variable width thread on a connection comprising tapered interfering threads, with the aim of avoiding overpressures of grease between the roots and crests of the threads, which overpressures can cause erroneous measurements for the makeup torque in connections of the type described in US RE30647.

International patent application WO 94/29627 describes an adaptation of a variable width thread on a connection comprising tapered interfering threads with the aim of making up the connection to a very high makeup torque. In WO 94/29627, making up of a wedge thread is continued after the male lateral flanks of the thread have come into contact with the female flanks, the total surface of the thread flanks enabling a very high makeup torque to be exerted with no risk of plastification.

In the majority of threaded connections, in particular those with tapered threads, the makeup torque increases regularly during makeup and/or increases suddenly at a given moment but in any event it must remain below a value corresponding to that for plastification of the metal, as plastification causes permanent deformation of the metal and there is a risk of galling in the plasticized zones after several makeup-breakout operations.

If the slope of the graph of makeup torque vs number of screw turns is high, the maximum allowed torque will be reached after a relatively low rotation of one element relative to the other: this is the case, for example, in a threaded connection with threads which interfere very strongly or after the lateral flanks on a connection with trapezoidal threads with no axial clearance or with variable width threads come into contact.

Since machining tolerances cause variable slopes in the torque curves depending on matching of the male/female threads, it is not possible under such conditions to predict the final relative position of the elements of the connection for the maximum allowed value of the torque.

The above disadvantages are amplified when each male and female element also comprises a metal-metal sealing surface and an abutment such as, for example, in EP-A-0 454 147 as the action of the thread, the sealing surface and the abutment at the end of screwing must be synchronised at the end of connection makeup for all male-female element mating scenarios.

SUMMARY OF THE INVENTION

The present invention seeks to provide a connection between two metal pipes using tapered, straight or straight-tapered threads with different thread forms and connection clearances which can overcome the disadvantages described above.

The term "thread" as used in the remainder of the document means the totality of the threaded portions of an element. A thread can thus be constituted by a single threaded portion or by a plurality of threaded portions, for example two stepped straight threaded portions or by one tapered threaded portion and one cylindrical threaded portion of the type described in U.S. Pat. No. 5,437,429, the thread of that patent being termed straight-tapered.

In accordance with the invention, a threaded connection for two metal pipes comprising a male element at the end of a first pipe and a female element at the end of a second pipe, the male element comprising a male external thread, the female element comprising a female internal thread wherein each of the thread flanks is parallel to the corresponding flank on the male thread, the male and female threads being screwed one into the other, is such that at least one of the male or female threads comprises a groove formed in the thread and opening either into the stabbing flank or into the crest of the thread or straddling the stabbing flank and the thread crest.

The fact that each of the flanks of the female thread is parallel to the corresponding male flank enables the elements to be connected without one or other of the flanks bearing only at a point on the mated flank.

The term "groove" means a cavity with two groove walls and a groove base, the developed length in the thread being long with respect to its width and to its depth, the latter dimensions being measured in a cross sectional plane passing through the pipe axis.

The groove profile corresponds to the intersection of the groove by its cross section and the width of the groove is measured at this profile at a given depth.

Until now, threads have been considered to be a solid whole and past attempts have been to reinforce them. It is thus surprising that we have noticed the importance of considering them to be a structure the stiffness of which can be modified by forming a groove therein.

The function of the groove formed in the thread of the present invention is to reduce contact forces between the male and female threads and thus in particular to reduce the makeup torque which is proportional to the contact forces.

To this end, the groove can be disposed in the thread so as either to increase the flexibility of the portion of the thread which comes into contact under pressure with the mating thread, or to reduce the contact surfaces, or to affect these two aspects at the same time.

Examples of dispositions for the groove satisfying these functions on the threaded connections of the invention will be described below for different types of threads and for different thread forms.

U.S. Pat No. 3,882,917 and French patent FR-A-2 408 061 describe threaded connections in which one of the threads possesses a kind of groove opening at the thread crest but such grooves are strictly associated with thread flank structures to obtain a self-blocking connection, i.e., resisting breakout.

In the case of U.S. Pat. No. 3,882,917, one of the thread flanks has a protruding rib with three faces one face of which bears against the corresponding flank of the mating thread, the two other faces delimiting a type of groove which enables the rib to bend.

In FR-A-2 408 061, applicable to trapezoidal threads, the inclination of the flanks of the grooved thread is different from that of the non grooved thread and is such that the width of the groove at its opening reduces during makeup under bending forces resulting from the difference in the orientation of the flanks between the mated threads.

None of those documents discloses the function of the groove in the connection in accordance with the invention and none applies to female threads where each of the thread flanks is parallel to the corresponding flank of the male threads.

The groove of the invention can thus be formed in tapered, straight or straight-tapered threads, with single or a plurality of steps, interfering threads or threads with no axial clearances and with a constant thread width or with a thread width which is variable along the thread.

The groove can be formed in triangular, round or trapezoidal threads; the term "trapezoidal threads" as used in the remainder of the present document including threads with a negative load flank angle of the type described in EP-A-0 454 147 or with a positive load flank angle and with dovetail shaped threads of the type described in US RE 30647, or half dovetail, as described in WO 94/29627.

The groove can be formed over all or a portion of the male or female thread or in both simultaneously.

It can also be formed alternately on portions of the male and female thread.

It can also be continuous or discontinuous on the male or female threads.

For threads comprising runout threads, the groove may be formed only in threads termed perfect threads, i.e., of full depth, or it may be also formed in imperfect threads.

A wide variety of groove profiles can be used, for example a semi-circular groove, a U with parallel or non parallel branches, a symmetrical or asymmetrical V or a combination of these shapes, in particular a U or a V with a rounded base with a given radius, or a more complex and non symmetrical profile.

The groove profile is preferably constant over all of its length.

When the groove opens into the crest of the thread, the axis of the groove profile may be perpendicular to the axis of the connection or inclined to that perpendicular, depending on the case.

When the groove opens into the stabbing flank, the axis of the groove profile may be parallel to the axis of the connection or inclined to it, depending on the case.

Optionally, the depth or width of the groove, or both, may vary over its length.

The base of the groove preferably has a radius of 0.2 mm or more to limit stress concentration at that location.

Preferably, when the groove opens into the crest of the thread, the width of the groove measured at its opening is less than or equal to $2/3$ of the width of the thread.

In the remainder of the present document, the term "thread width" means the width measured axially at the half-height of the thread, and the term "thread depth" means the distance measured in a plane perpendicular to the axis of the connection between the root and crest lines of the thread.

Preferably, when the groove opens into the stabbing flank, the groove width at its opening is less than or equal to ⅔ of the thread depth.

Preferably again, when the groove is located on the stabbing flank of the thread, its depth is less than or equal to ⅔ of the thread depth.

Preferably again, when the groove is located on the thread crest, its depth is less than or equal to the thread depth such that the base of the groove does not go beyond the line joining the thread roots.

Preferably again, when the groove straddles the thread crest and stabbing flank, its opening width and its depth satisfy both the criteria for a groove opening into the thread crest and for a groove opening into the stabbing flank. For this c reason, its depth is less than or equal to the lesser value of the thread depth and ⅔ of the thread width and its opening width is less than or equal to ⅔ of the lesser value of the thread width and the thread depth.

Advantageously, the male and female elements of the threaded connection of the invention each comprise at least one metal-metal sealing surface, each male sealing surface located on the male element radially interfering with a female surface located in a corresponding manner on the female element so as to create at least one metal-metal sealing contact between the male and female elements at the end of the connection makeup.

Advantageously again, the male and female elements of the threaded connection of the invention each comprise an abutment, the male abutment located on the male element bearing on the female abutment located on the female element to precisely determine the position of complete connection makeup and placing the load flanks of the male and female threads under contact pressure.

BRIEF DESCRIPTION OF THE DRAWINGS

Different non limiting embodiments of threaded connections of the invention will now be described.

Each of FIGS. 4 to 10 is composed of three sub-figures, suffix A corresponding to the female thread, suffix B to the male and suffix C to the two connected together.

Figure 8:
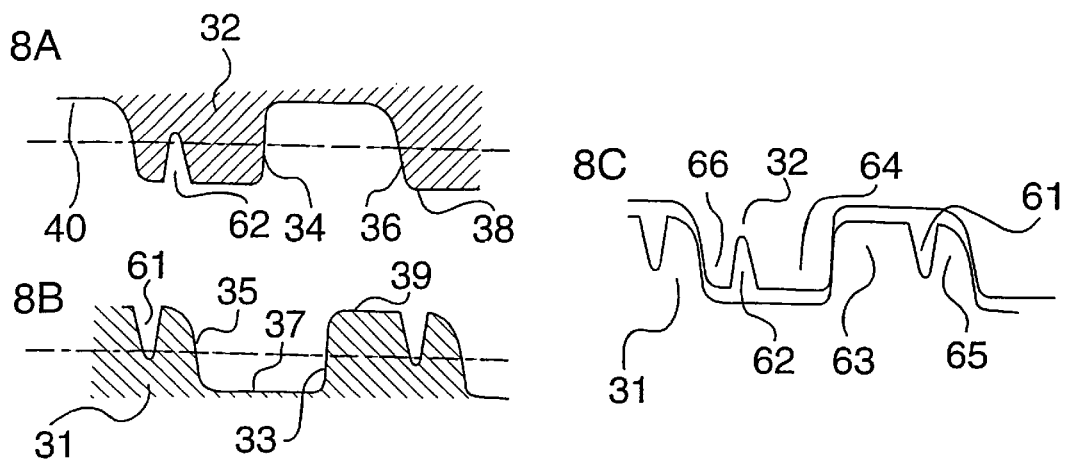
FIGS. 8 to 10 are also diagrams of a detail of a thread with a trapezoidal thread form with no axial clearance with a groove in accordance with the invention, each figure representing a different disposition for the groove.
Figure 11:
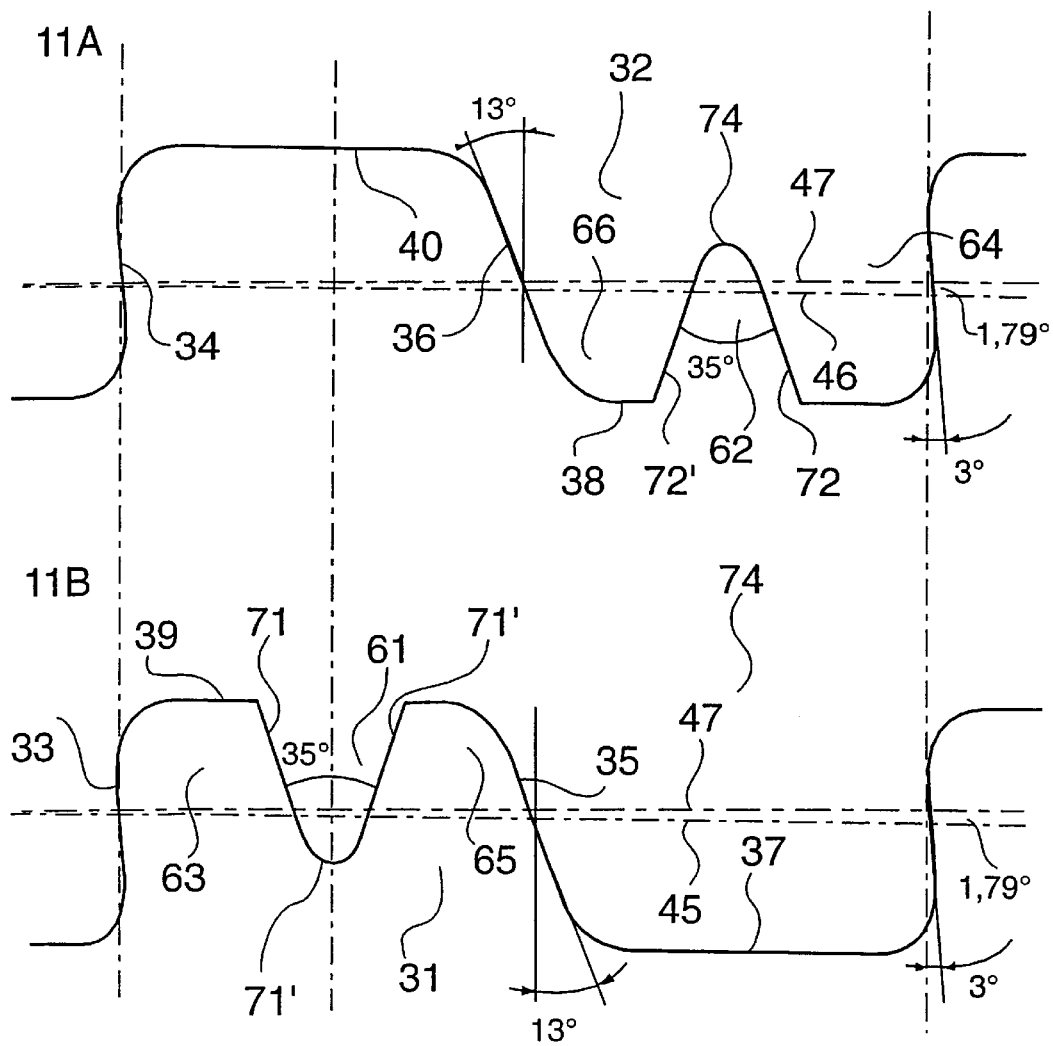

FIG. 11 shows in more detail the disposition of the groove on a thread of the type shown in FIG. 8, FIG. 11A relating to the female thread and FIG. 11B to the male thread.

Figure 12:
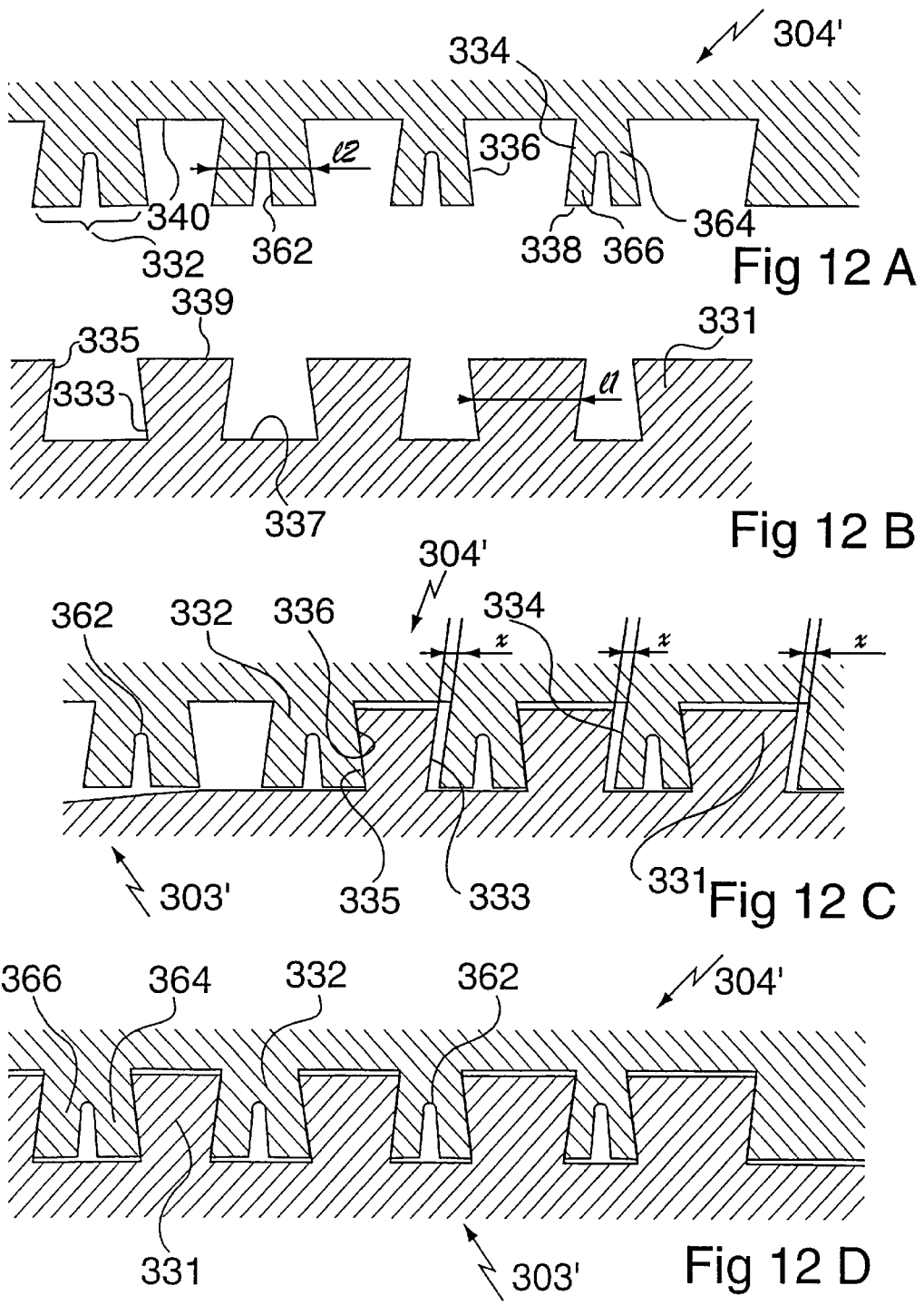

FIG. 12 is a diagram of a detail of a straight thread with edge threads of variable width and a groove in accordance with the invention, FIGS. A, B,C and D being respectively relevant to the female thread, the male thread, to the connection during makeup and to the made up connection.

Figure 13:
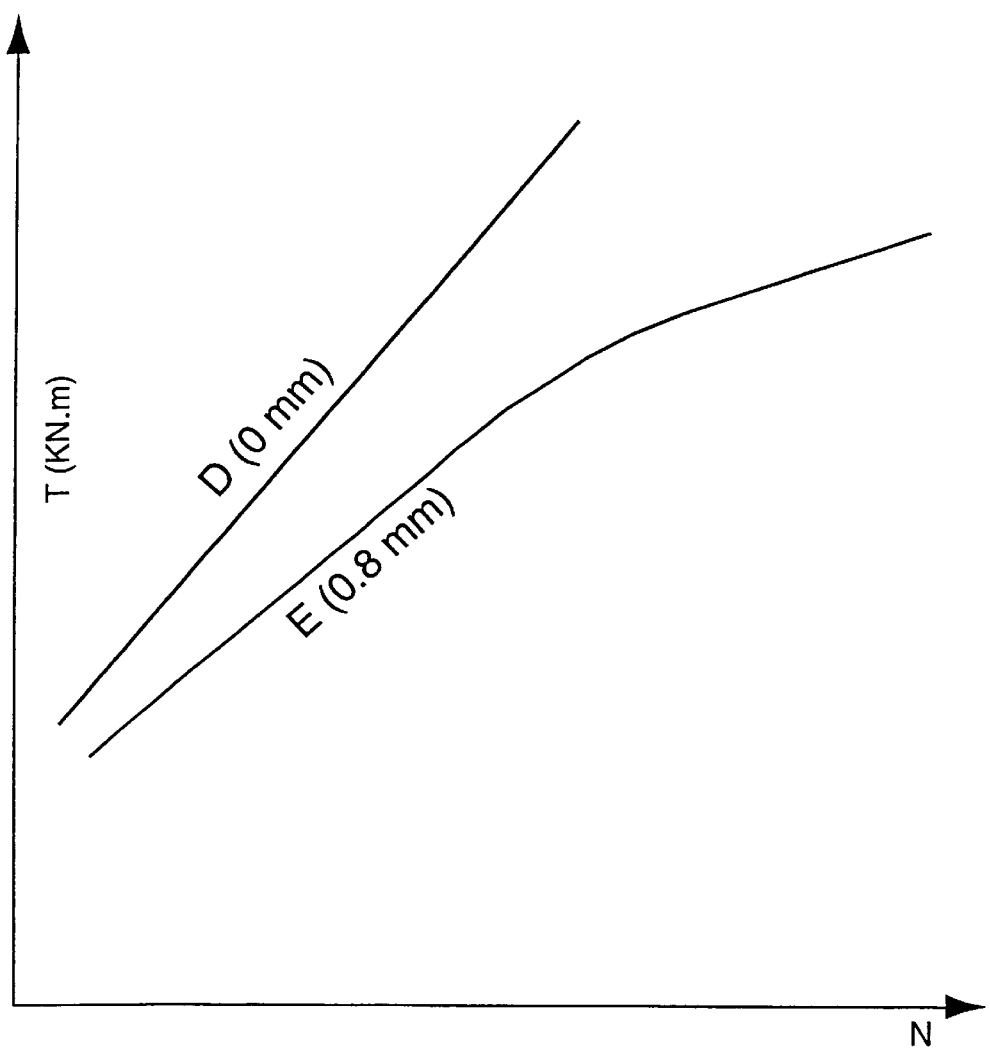

FIG. 13 is a schematic graph of the makeup torqueT against the number of turns N for a pipe connection with a thread in accordance with FIG. 12.

FIG. 14 is a diagram of a detail of a tapered thread with wedge threads with a variable width and a groove in accordance with the invention, FIGS. A, B, C and D respectively relating to the female thread, the male thread, to the connection during makeup and to the made up connection.

All of the figures are simply diagrams; the tapers and clearances in particular are not drawn to scale and have been magnified to enable better comprehension of the operation of the connections.

DESCRIPTION OF THE PREFERRED EMBODIMENTS

Figure 1:
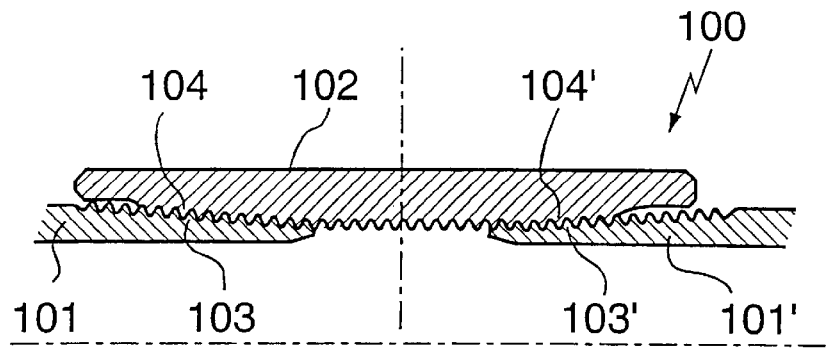
FIG. 1. is a diagram of a prior art threaded and coupled (T & C) connection for two pipes with tapered threads.

FIG. 1 shows a threaded connection 100 in accordance with specification API 5CT between two metal pipes 101 and 101' using a coupling 102.

Each end of pipe 101, 101' comprises a male element comprising a male tapered thread 103, 103' with round threads.

Coupling 102 comprises two female elements disposed symmetrically with respect to the medial plane of the coupling, each female element comprising a female tapered thread 104, 104' with threads which mate with those of the male element.

Male threads 103, 103' are screwed into mating female threads 104, 104'.

For this type of connection, specification API 5B defines the thread form, their dimensions, the thread taper, the thread pitch, etc. . .

Although it has not been shown, a "Buttress" type connection can also be used in accordance with specifications API 5CT and 5B, similar to that of FIG. 1 but with trapezoidal threads.

Figure 2:
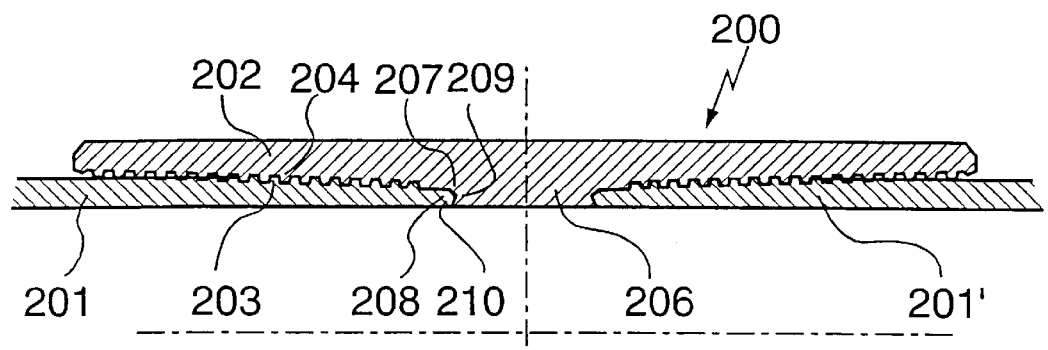
FIG. 2 is a diagram of a variation of the same type of prior art connection.

FIG. 2 shows a known T & C connection 200 with tapered threads 203, 204 and with a trapezoidal thread form, coupling 202 having a lug 206 in its central portion, which lug renders the flow of fluid in pipes 201, 201 ' non turbulent and can house female abutments 210 which bear against male abutments 209 constituted by the annular end surfaces of the pipes.

Tapered male 207 and female 208 sealing surfaces located on the non threaded portions and radially interfering so as to form an elastic contact pressure between them and enable the sealing of the connection of FIG. 2 in known manner.

The tapered shape of male and female abutments 209, 210 also reinforce the contact pressure at the sealing surfaces 207, 208 and thus increase the seal of the connection.

Figure 3:
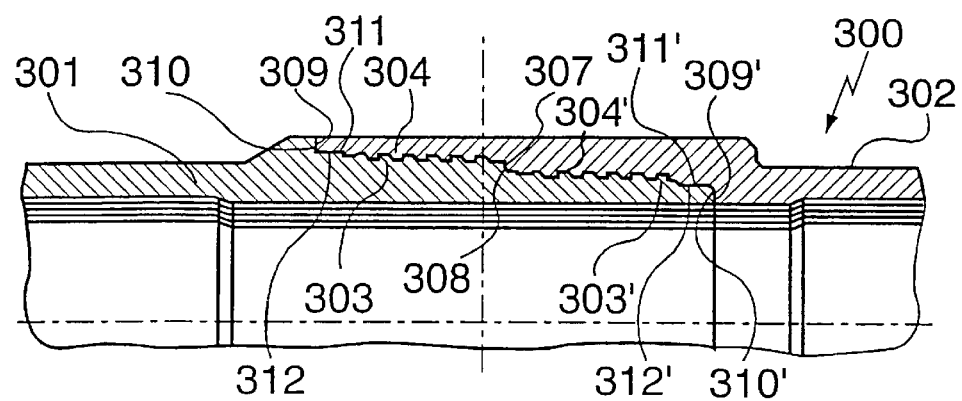
FIG. 3 is a diagram of a prior art integral connection for two pipes using a two-step sight thread.

FIG. 3 shows an integral threaded connection between two pipes 301 and 302 comprising two-step straight threads.

The end of pipe 301 comprises a male element comprising a straight two-step male thread 303, 303', a male tapered shoulder surface 307 in a half dovetail form between the two male threaded steps and abutments 309, 309' at each end of the male element.

The end of pipe 302 comprises a female element which mates with the male element and comprises a female straight two-step thread 304, 304', a female tapered shoulder surface 308 in a half dovetail form between the two female threaded steps and abutments 310, 310' at each end of the female element.

The male and female threads of connection 300 have a trapezoidal thread form and normally do not radially interfere after screwing.

In the made up state, shoulders 307, 308 form the principal abutment, abutments 309, 309', 310, 310' only acting as a safety abutment in the event of burying the principal abutment.

Close to the end of the male element, the tapered surfaces 311', 312' on the male and female elements respectively form an internal pair of metal-metal sealing surfaces. Close to the end of the female element, the tapered surfaces 311, 312 form an external pair of metal-metal sealing surfaces. The external pair 311, 312 of sealing surfaces could also be located between shoulders 307, 308 and the large diameter thread step 303, 304.

FIGS. 4 to 10 and 12, 14 schematically illustrate the operation of a groove of the invention on threaded connections of the type shown in FIGS. 1 to 3. For clarity, FIGS. 4 to 10 and 12, 14 show only a few male and female threads.

Figure 4:
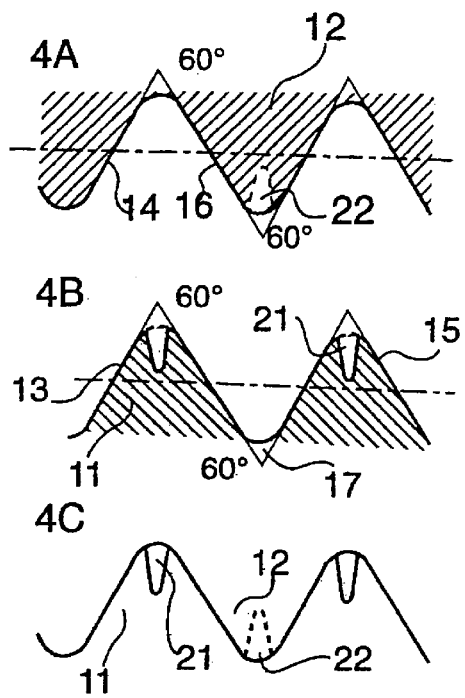
FIG. 4 is a diagram of a detail of a thread with a round thread form with a groove, in accordance with the invention.

FIG. 4 shows portions of tapered threads with round thread forms with a groove on a connection of the type shown in FIG. 1, in accordance with the invention.

Male threads 11 (FIG. 4B) comprise a load flank 13 and a stabbing flank 15 each at 30° either side of a plane perpendicular to the connection axis while the thread root 17 is rounded.

A groove 21 is cut radially into the crest of the male thread with a V profile with a rounded base.

The width of groove 21 at its opening is of the order of 25% of the width of thread 11, its depth being equal to 50% of the thread depth.

The radius at the base of the groove is 0.4 mm.

Female threads 12 (FIG. 4A) comprise a load flank 14 and a stabbing flank 16 mating with those of the male threads, the thread root being rounded.

The load flank 14 and stabbing flank 16 are each located at 30° to each side of a plane perpendicular to the connection axis and are thus respectively parallel to male flanks 13, 15.

A groove 22, shown as a dotted line and identical in shape and disposition to groove 21, can be radially cut into the crest of the female thread in place of or complementary to the groove 21 of the male thread.

Grooves 21 and/or 22 at the thread crest increase the flexibility of the threads and thus reduce the contact pressure on the lateral flanks thereof and reduce the makeup torque compared with solid threads.

Figure 5:
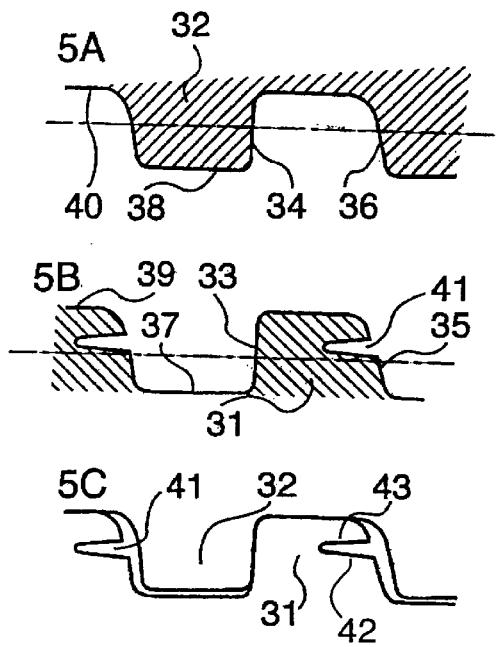
FIGS. 5 to 7 are diagrams of a detail of a thread with a trapezoidal interfering thread form with a groove in accordance with the invention, each figure representing a different disposition for the groove.

FIG. 5 shows portions of tapered threads with an interfering trapezoidal thread form with a groove 41 opening into the stabbing flank, in accordance with the invention, on a connection of the type shown in FIG. 2.

Male threads 31 (FIG. 5B) comprise a load flank 33 the orientation of which is substantially normal to the connection axis, and a stabbing flank 35 inclined at about 10° to the plane normal to this axis, a thread root 37 and a thread crest 39.

The thread roots 37 and thread crests 39 are parallel to the taper of the thread.

Groove 41 partially separates the male thread 31 into two portions; it has a V profile with a rounded base orientated substantially parallel to the connection axis.

The width of groove 41 at its opening into the stabbing flank is ⅓ of the thread depth and its depth is 50% of the thread width.

The vertex angle of the V of groove 41 is about 30° and the branch 42 of the V on the root side of the male thread is substantially parallel to the connection axis.

The groove base is an arc with a radius of 0.4 mm.

The form of female threads 32 (FIG. 5A) mates with that of the corresponding male threads 31, i.e., their contours are parallel to the contours of the corresponding male threads, in particular the load flanks 33, 34 are parallel to each other and the stabbing flanks 35, 36 as well; the depth of the female thread is, however, slightly less than that of the male thread and the root width of the female thread 40 is slightly larger than that of the mating male crests 39.

The female threads 32 do not comprise a groove.

FIG. 5C schematically illustrates the operation of the connection at the end of the makeup.

At the end of the connection makeup, the mating load flanks 33 and 34 are in contact under pressure because, for example, of the reaction of the abutments or of an axial tensile force on the connection. This contact pressure is distributed over the whole width of the load flanks because the male load flanks are parallel to the female load flanks.

Similarly, the crests 39 of the male threads are in radially interfering contact with the roots 40 of the female threads. In contrast, because of the geometry described above, a clearance is provided between the mating stabbing flanks 35 and 36 and between the male thread roots 37 and the female thread crests 38.

The upper portion 43 of male thread 31, subjected to the radial interference of surfaces 39 and 40, can bend elastically and reduce the contact pressure and thus the makeup torque.

The flexibility of the upper portion 43 of male thread 31 can be adjusted by adjusting the position of groove 41 on the stabbing flank 35 and by adjusting the depth of the groove.

Because of the absence of radial interference between the male thread root 37 and the female thread crest 38, the presence of a groove opening into the stabbing flank 36 of the female thread is not operationally justified.

Such a disposition of the groove on the interfering threads can in particular be of interest as regards reducing the contact pressure between the thread crests and roots at the level of the threads close to the metal-metal sealing surfaces; a high contact pressure here induces a discharge thereof between the sealing surfaces: thus a groove is only provided in the portion of the thread close to the bearing surface.

Although it has not been illustrated, it is also possible in a symmetrical way to envisage a connection with radial interference between the roots of male thread 37 and the crest of the female thread 38 and a groove formed in the female thread and opening onto the stabbing flank 36.

Figure 6:
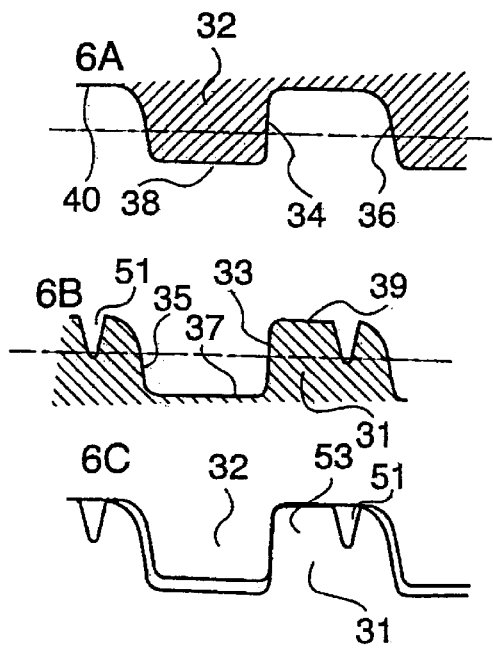

FIG. 6 shows portions of tapered threads with interfering trapezoidal thread form in accordance with the invention, similar to those of FIG. 5 but groove 51, with a V profile with a rounded base, is formed in the male threads so as to open into thread crest 39.

The function of groove 51 is firstly to reduce the radially interfering surface areas 39 and 40 so as to reduce the frictional force which is proportional to surface areas and secondly to increase the flexibility of the bearing portion 53 of the thread when the load flanks 33 and 34 are under contact pressure, which also reduces frictional forces, and thus the makeup torque of the connection.

The shape of groove 51 is similar to that of groove 41, but it is located radially and opens into the thread crest 39, towards stabbing flank 35. Its opening width is thus, for example, 60% of the width of the male thread and its depth is 50% of the thread depth.

As in FIG. 5, the presence of a groove at the female thread crest 38 is not justified, as no friction is produced here with the male thread root 37.

Figure 7:
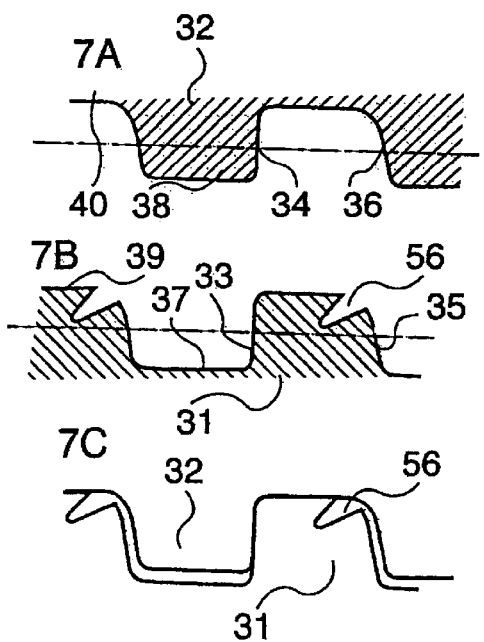

FIG. 7 shows portions of tapered threads with an interfering trapezoidal thread form similar to those of FIG. 5, except that the groove 56 with a V profile and a rounded base is disposed in the male threads so as to open straddling male thread crest 39 and male stabbing flank 35.

Because of its straddling position, the orientation of groove 56 in the bulk of the thread is oblique and the axis of the groove profile forms an angle of 45°, for example, to the thread crest 39.

The disposition of groove 56 can both increase the flexibility of the thread, the faces 33 and 39 of which are subjected to contact pressures, and reduce the contact surfaces 39, 40.

FIG. 8 shows portions of tapered threads with a trapezoidal thread form with no axial clearance in accordance with the invention, a groove 61 being formed in the crest 39 of the male thread 31 and a further groove 62 being formed in the crest 38 of female thread 32.

The form of threads 31, 32 is similar to that of the threads in FIG. 5; in particular the contour of the female threads 32 is parallel to the contours of the corresponding male threads 31, except that the crests 39 of male thread 31 and the roots 40 of female thread 32, the roots 37 of the male thread and the crests 38 of the female thread are disposed so as not to interfere radially during makeup while lateral flanks 33, 34, 35 and 36 are disposed such that they just come into contact at the end of the connection makeup, as shown in FIG. 8C.

In Common with the preceding figures, the male 61 and female 62 grooves have a V profile with a rounded base.

In common with the preceding figures, the vertex angle of the V of grooves 61, 62 is about 30° and the radius of the point of the V is 0.4 mm.

The depth of grooves 61, 62 is, for example, 70% of the thread depth and their opening width in the thread crest is 35% of the thread width.

Grooves 61, 62 act to cut half-teeth 63, 65 into the male thread and 64 and 66 into the female thread.

These half-teeth are far more flexible than a solid tooth when the mating lateral flanks 33, 34, 35, 36 come into contact at the end of the connection makeup. Thanks to this increased flexibility, the action of abutments such as 209, 210 in FIG. 2 can be synchronised, with the approach of the mating lateral flanks; premature approach of these flanks because of poorly matched male and female elements, which occurs in a small proportion of manufacturing means, in this case simply results in a slight elastic deformation of the threads at the end of connection makeup but correct positioning of the abutments 209, 210, necessary to obtain satisfactory sealing of the sealing surfaces 207, 208, is obtained.

The following example shows an application of such a configuration:

external pipe diameter: 177.8 mm (7");
pipe thickness: 10.36 mm (29 lb/ft);
material treated for a minimum yield stress of 551 MPa;
tapered thread with 5 trapezoidal threads per inch with a 6.25% taper (i.e., an angle of 1.79° between the pitch tapers 45, 46 and the direction 47 of the connection axis).

FIGS. 11B and 11A show a detail of FIG. 8 with the respective form of male and female threads 31 and 32 which are dimensioned so as not to have any axial clearance after makeup.

In the Figures, load flanks 33, 34 are at slightly negative angles of −3° while stabbing flanks 35, 36 are both inclined at 13° with respect to the normal to the connection axis. The crests 38, 39 and roots 37, 40 of the threads are parallel to the generatrices of the pitch tapers 45, 46 which are inclined at 1.79° to the connection axis.

The thread width is close to 2.54 mm and the thread depth is 1.6 mm.

The axis of grooves 61, 62 disposed respectively on the male thread 31 and on the female thread 32 is perpendicular to the connection axis and they open into the thread crest 39, 38.

Grooves 61, 62 have two inclined groove walls 71, 71', 72, 72' and connected by a groove base 73, 74 such that the groove profile is an asymmetrical V shape with a rounded base.

The distance between the axis of grooves 61, 62 and the corresponding load flank 33, 34 in this case is 1.4 mm.

The vertex angle of the V is 35°, wall 71, 72 directed towards the load flank 33, 34 being a little more inclined to the V profile axis than the other wall 71', 72'.

The radius at the base of groove 73, 74 is 0.4 mm.

The depth of grooves 61, 62 in FIG. 11 is 1 mm, namely 62.5% of the thread depth. The opening width is thus 38% of the thread width.

Although not shown, a threaded connection with trapezoidal threads of the invention can also be produced in which the tapered threads do not have an axial clearance but interfere radially when made up, at least one of the threads having a groove opening into the thread crest.

Figure 9:
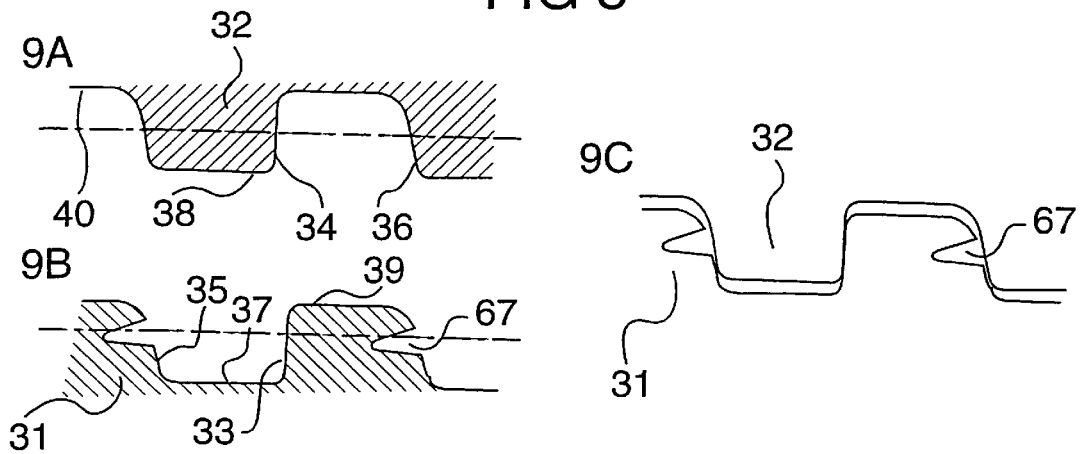

FIG. 9 of the invention shows portions of tapered threads with trapezoidal threads and an axial clearance as is the case for FIG. 8 but a groove 67 has been produced in male thread 31 opening into its stabbing flank 35 to reduce the contacting frictional surfaces.

Groove 67 has an axis which is substantially close to the connection axis.

As an example, its depth, measured axially, can be 50% of the width of the thread and its width at its opening is 50% of the depth of the male thread.

Its profile, as in the preceding figures, is a V with an angle of about 30° with its point ending in a radius of 0.4 mm.

The presence of a groove in the female stabbing flank in addition to groove 67 is not justified.

Figure 10:
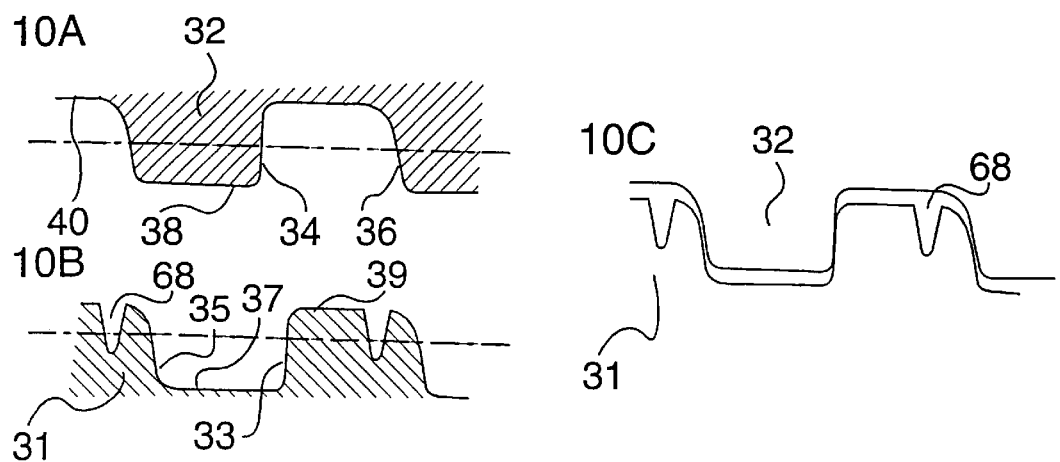

FIG. 10 shows a groove 68 opening so as to straddle the crest of male thread 39 and the male stabbing flank 35 of the connection in accordance with the invention with tapered threads with a trapezoidal thread form with no axial clearance of the type shown in FIG. 8.

As was the case for FIG. 7, the groove is inclined with respect to the thread crest and the stabbing flank and can reduce both the contact pressure on the lateral mating flanks and the frictional contacting surfaces.

Although it has not been shown, it is possible in accordance with the invention to produce a connection with straight threads and a trapezoidal thread form with a groove, the groove or grooves being located, for example, at the thread crest or straddling the thread crest and the stabbing flank and intended to reduce the contact pressure on the load flanks.

It is also possible, in accordance with the invention, to envisage a groove at the crest thread on straight, tapered or straight-tapered trapezoidal wedge threads where the width of the male and female thread varies along the length of the thread, so that the lateral flanks of the threads are brought into a contact pressure at the end of makeup.

FIG. 12 illustrates a groove disposed at the crest of a variable width wedge thread on threads 303', 304' of a two-step straight thread connection of the type shown in FIG. 3.

Male threads 331 of FIG. 12B are trapezoidal and comprise a load flank 333, a stabbing flank 335, a thread crest 339 and a thread root 337, the crests and roots being located on cylindrical surfaces coaxial with the connection axis.

The load and stabbing flanks form, with the normal to the connection axis, an angle which conventionally is taken to be negative such that thread 331 is in the form of a dovetail.

The width l 1 of the male thread continuously increases on each step from the threads located at the free end side of the male element towards those located on the opposite side.

The female elements 332 of FIG. 12A are trapezoidal and dovetailed mated with that of the male threads 331 and they comprise a load flank 334, a stabbing flank 336, a thread crest 338 and a thread root 340, the crests and roots of the thread being located on cylindrical surfaces coaxial with the connection axis.

Each of the female thread flanks 334, 336 is parallel to the respective corresponding flank 333, 335 of the male thread.

The width l 2 of the female threads continuously increases on the same step from the threads located at the free end side of the female element towards those located on the opposite side, in a manner which co-ordinate with the evolution of the width of the male threads on the male thread.

The female threads comprise a groove 362 which opens into the thread crest 338 the form and disposition of which are similar to 62 in FIG. 8A.

FIG. 12C shows the male and female threads of a step during makeup: a constant space x exists between load flanks 333, 334 of each thread engaged with its mate.

Further, with this type of straight thread, there is no radial interference between the mated crests and roots 337–338, 339–340.

As the male element is screwed into the female element, the space between the mating lateral flanks reduces to zero as shown in FIG. 12D.

If screwing is continued beyond this point, the male lateral flanks 333, 335 press into the mating female flanks 334, 336, the contact pressure between the mating flanks increasing as screwing is continued. This results in a very rapid rise in the makeup torque and, depending on the developed surface of the flanks, makeup can be completed with under an extremely high torque.

Groove 362, like in the preceding figures, has a V profile with a rounded base, the vertex angle of the V of the grooves being about 30° and the radius of the point of the V being 0.4 mm. Their depth, for example, is 70% of the thread depth and their width at the opening into the thread crest is 35% of the thread width.

Groove 362 cuts half-teeth 364 and 366 into female thread 332, which half teeth are much more flexible than a solid tooth.

The presence of a groove in such threads 331, 332 with a variable width results in a reduction in the slope of the makeup torque T—element rotation N curve as shown by the appearance of the curve E in FIG. 13 with respect to curve D relating to similar threads with no groove although the maximal admissible makeup torque is slightly reduced by the presence of the groove.

The presence of a groove in such threads with a variable width also results in a self-limiting effect of the torque T beyond a certain threshold. This prolongs the rotation N possible before achieving the maximum admissible makeup torque and enables one or more pairs of separate sealing surfaces 307, 308 to be correctly positioned using one or more pairs of abutments 309, 309', 310, 310' in all male-female mating scenarios.

FIG. 14 shows a groove located at the crest of a wedge thread with a variable width on threads 203, 204 of a tapered thread connection of the type shown in FIG. 2.

Male threads 231 in FIG. 14B are trapezoidal in form and comprise a load flank 233, a stabbing flank 235, a thread crest 239 and a thread root 237, the crests and roots of the thread being disposed on the tapered surfaces coaxial with the connection axis and with the same taper.

In an alternative (not shown), the crests and/or roots of the threads can be parallel to the connection axis, the pitch surface nevertheless being tapered.

The load flanks 233 form, with the normal to the axis of the connection, an angle which is conventionally taken to be negative while the stabbing flanks 235 form, with the normal to the axis of the connection, an angle which is conventionally taken to be positive.

The angle between the load flank and the stabbing flank of a thread is such that the flanks 233, 235 diverge on travelling towards the thread crest 239 such that thread 331 is in a form known as a half dovetail.

The width of the male thread continuously increases from the threads located on the side of the free end of the male element towards those located on the opposite side.

The male threads comprise a groove 261 which opens into the thread crests 239 the form and disposition of which are similar to 61 in FIG. 8B.

The female threads 232 of FIG. 14A are trapezoidal mated with those of male threads 231 and they comprise a load flank 234, a stabbing flank 236, a thread crest 238 and a thread root 240.

Each of flanks 234, 236 of the female thread is parallel to the respective corresponding flank 233, 235 of the male thread.

The width of the female threads increases continuously from the threads located on the side of the free end of the female element towards those located on the opposite side, in a manner coordinated with the evolution of the width of the male threads of the male thread form.

FIG. 14C shows male and female threads during makeup: a constant space x can be seen between the load flanks 233, 234 of each thread taken with its mate.

As the male element is screwed into the female element, space x between the mating lateral flanks reduces to zero as shown in FIG. 14D. If makeup is continued beyond this point, the male lateral flanks 233, 235 press into the mating female flanks 234, 236, the contact pressure between the mating flanks increasing as makeup is continued.

This results in a very rapid increase in the makeup torque and, depending on the developed surface of the flanks, makeup can be completed under a very high torque.

Further, with this type of wedge thread tapered thread, it can be arranged such that when makeup is complete, there is a radial interference between the crests and roots of the mated thread 237–238 and/or 239–240 such that male threads 231 completely fill the hollows between the female threads and/or the female threads 232 completely fill the hollows between the male threads. FIG. 14D shows a case of complete filling of the male and female threads, the thread thus being tight in itself and enabling the presence of grease between the crests and roots of the mated threads on completion of makeup to be avoided, which presence is a cause of an erroneous measure of the makeup torque. Preferably, it is arranged such that a radial interference develops before the mating lateral flanks come into contact.

As in the preceding figures, male groove 261 has a V profile with a rounded base, the vertex angle of the V of the grooves being about 30° and the radius of the point of the V being 0.4 mm. Its depth is, for example, 70% of the thread depth and its width at its opening into the thread crest is 35% of the thread width.

The groove cuts half teeth 263, 265 into male thread 231, which half teeth are much more flexible than a solid tooth and fulfil the same functions as the groove 362 in the connection of FIG. 12, which functions have been described above in the text. It can also better synchronise the axial extension of the lateral flanks with the radial interference of the crests and roots towards the end of makeup.

The connection of the present invention can be produced in a number of variations, the several examples of which given here not in any way being limiting in nature.

In particular, the present invention can be applied to:

an integral threaded connection as shown in FIG. 3, a male element being disposed at the end of a first long metal pipe and a female element being disposed at the end of a second long metal pipe, and to a T & C connection as shown in FIGS. 1 and 2, in which two long metal pipes comprising a male element at its end are connected via a metal coupling each end of which is provided with a female element, such a T & C connection constituting two threaded connections of the invention.

What is claimed is:

1. A threaded connection for two metal pipes comprising a male element at the end of a first pipe and a female element at the end of a second pipe, the male element comprising a male external thread, the female element comprising a female internal thread, wherein each thread flank is parallel to a corresponding flank of the male thread, the male and female threads being screwed one onto the other, characterized in that at least one of the male or female threads comprises, with the aim of reducing the contact forces between the male and female threads, a groove comprising two groove walls and a groove base, which is provided in the bulk of the thread and which opens either into a stabbing flank or into a thread crest or straddling the stabbing flank and the thread crest.

2. A threaded connection according to claim 1, characterized in that the groove is continuous over a developed length of the thread or threads.

3. A threaded connection according to claim 1, characterized in that the groove has walls with a V profile and a rounded base.

4. A threaded connection according to claim 1, characterized in that the base of the groove has a radius of 0.2 mm or more.

5. A threaded connection according to claim 1, characterized in that the width of the opening of the groove opening into the thread crest is less than or equal to $\frac{2}{3}$ of the thread width.

6. A threaded connection according to claim 1, characterized in that the width of the opening of the groove opening into the stabbing flank is less than or equal to $\frac{2}{3}$ of the thread depth.

7. A threaded connection according to claim 1, characterized in that the width of the opening of the groove straddling the thread crest and the stabbing flank is less than or equal to $\frac{2}{3}$ of the lesser of the width or depth of the thread.

8. A threaded connection according to claim 1, characterized in that the depth of the groove, located on the thread crests is less than or equal to the thread depth.

9. A threaded connection according to claim 1, characterized in that the depth of the groove formed in the stabbing flank is less than or equal to $\frac{2}{3}$ of the thread width.

10. A threaded connection according to claim 1, characterized in that the depth of the groove straddling the thread crest and the stabbing flank is less than or equal to the lesser of the thread depth and $\frac{2}{3}$ of the thread width.

11. A threaded connection according to claim 1, characterized in that the male and female threads are tapered with trapezoidal threads disposed in one step or in a plurality of steps.

12. A threaded connection according to claim 11, characterized in that at least one of the male and female thread crests radially interferes with the mated thread root or roots when makeup is complete.

13. A threaded connection according to claim 11, characterized in that the male and female threads are trapezoidal with no axial clearance.

14. A threaded connection according to claim 1, characterized in that the male and female threads are straight, disposed in one or a plurality of steps, or are straight-tapered.

15. A threaded connection according to claim 1, characterized in that the width of the male and female thread varies along the entire length of the thread or of each threaded portion in a co-ordinated manner to constitute wedge threads.

16. A threaded connection according to claim 1, characterized in that the male and female threads are tapered with round threads.

17. A threaded connection according to claim 1, characterized in that the male element comprises at least one male sealing surface and the female element comprises at least one female sealing surface, the corresponding male and female sealing surfaces radially interfering when makeup is complete so as to create at least one metal-metal sealing contact between the male and female elements.

18. A threaded connection according to claim 1, characterized in that the male and female element each comprise at least one abutment, the abutment or abutments of the male element bearing against the corresponding abutments of the female element at the end of the connection makeup.

19. A threaded connection according to any claim 1, characterized in that it is an integral type.

20. A threaded connection according to claim 1, characterized in that it is of a threaded and coupled type.

21. A threaded connection according to claim 14, characterized in that the width of the male and female thread varies along the entire length of the thread or of each threaded portion in a co-ordinated manner to constitute wedge threads.

* * * * *

UNITED STATES PATENT AND TRADEMARK OFFICE
CERTIFICATE OF CORRECTION

PATENT NO.   : 6,481,760 B1
DATED        : November 19, 2002
INVENTOR(S)  : Thierry Noel et al.

It is certified that error appears in the above-identified patent and that said Letters Patent is hereby corrected as shown below:

Column 5,
Line 19, delete "c" before "reason".

Column 9,
Line 29, change "Common" to -- common --.

Column 11,
Line 8, change "11" to -- $\ell$ 1 --;
Line 19, change "12" to -- $\ell$ 2 --.

Signed and Sealed this

Twenty-second Day of April, 2003

JAMES E. ROGAN
*Director of the United States Patent and Trademark Office*